C. M. Baker.
Cattle Tie.
N° 61,138. Patented Jan. 15, 1867.
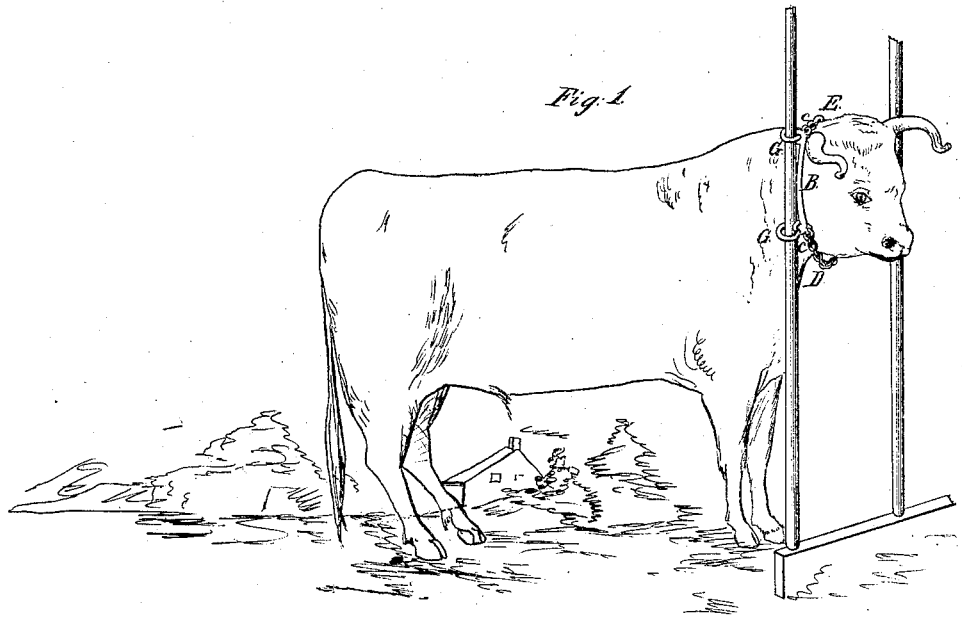
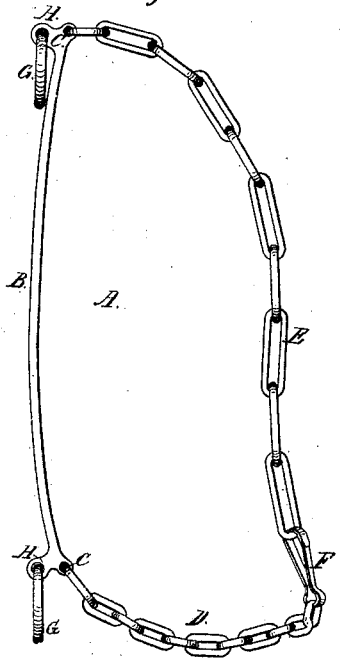
Witnesses.
Jas. A. Service
Wm. Trewin
Inventor:
Cyrus M. Baker
Per Munn & Co
Attorneys

United States Patent Office.

CYRUS M. BAKER, OF BINGHAM, MAINE.

Letters Patent No. 61,138, dated January 15, 1867.

IMPROVEMENT IN CATTLE-TIE FOR STALLS.

*The Schedule referred to in these Letters Patent and making part of the same.*

TO ALL WHOM IT MAY CONCERN:

Be it known that I, CYRUS N. BAKER, of Bingham, Somerset county, and State of Maine, have invented a new and improved Tie-Chain for Cattle and other Animals; and I do hereby declare that the following is a full, clear, and exact description thereof, which will enable others skilled in the art to make and use the same, reference being had to the accompanying drawing, forming part of this specification.

The present invention relates to a new and improved tie-chain for hitching or fastening oxen or other cattle and animals in their stalls, the object being to produce a tie-chain of such a nature that the cattle or other animals, when hitched or fastened by it to and in their stalls, cannot shift or move their heads to the other side of the posts or stanchions to which they are fastened or hitched, thus obviating all danger of the chain becoming twisted, which oftentimes causes the choking of the cattle, and also preventing the cattle from robbing each other.

In the accompanying plate of drawings my improved tie or hitching-chain is illustrated—

Figure 1 being a view of an ox, showing it applied, and the ox secured to a stanchion or post of the stall by it; and Figure 2, a detached view of the tie-chain.

Similar letters of reference indicate like parts.

A, in the drawings, represents my improved tie or hitching-chain for oxen or other cattle or animals, which tie-chain consists of a slightly-bent bar or rod, B, of iron, or other suitable metal or other material, of a length sufficient to extend the entire width of one side of the neck of the ox or other animal, in the eye C of each end of which bar are hung chains D and E, one to each eye, C, of a sufficient length that when their other ends are secured together by means of a snap-hook, F, or other suitable fastening device, they will extend around the remaining portion of the neck of the ox not embraced by the bent bar B. G G, rings hung to the eyes H of the bent bar B, one at each end; which rings, as plainly shown in fig. 1, are placed over the post or stanchion of the stall to which the ox or other animal is to be hitched or fastened.

By means of the above-described tie or hitching-chain for oxen and other animals, it is plain to be seen that the oxen, when hitched or fastened to a post or stanchion of the stall by it, cannot, by any possibility, succeed in shifting or moving their heads to the other side of such post, thus obviating all liability of the chain becoming twisted and consequently choking the ox or other animal; and that, furthermore, one animal cannot rob or pilfer the food or fodder of another in the stall next adjoining, the importance of which is obvious.

I claim as new, and desire to secure by Letters Patent—

The tie-chain herein described, the same consisting of the bar B, chains D and E, and rings G G, when all connected together, so as to be used for the fastening or hitching of cattle and other animals substantially as described.

CYRUS M. BAKER.

Witnesses:
 AMON BAKER,
 EUGENE F. GOODRICH.